(No Model.)
A. T. BALLANTINE.
Condenser for Ice Making Apparatus.
No. 229,942. Patented July 13, 1880.
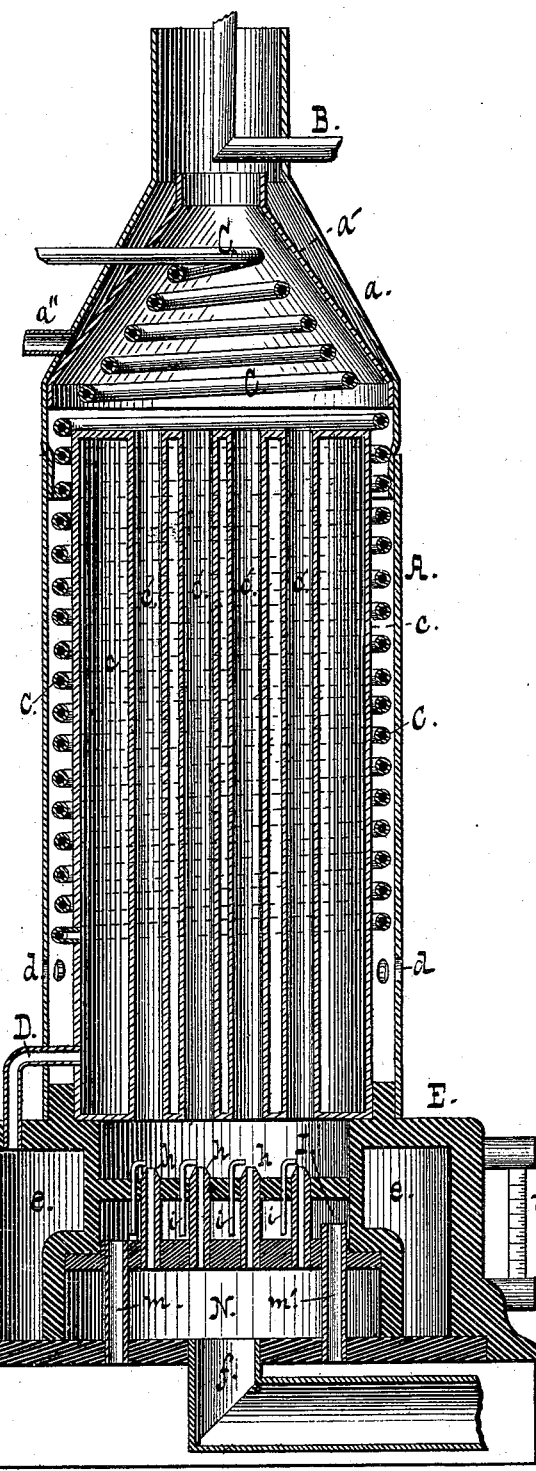

UNITED STATES PATENT OFFICE.

ALEXANDER T. BALLANTINE, OF PORTLAND, MAINE, ASSIGNOR OF ONE-HALF OF HIS RIGHT TO ROBERT A. RIPLEY, OF SAME PLACE.

CONDENSER FOR ICE-MAKING APPARATUS.

SPECIFICATION forming part of Letters Patent No. 229,942, dated July 13, 1880.

Application filed March 24, 1880. (No model.)

*To all whom it may concern:*

Be it known that I, ALEXANDER T. BALLANTINE, of the city of Portland, Cumberland county, State of Maine, have invented certain new and useful Improvements in Condensers for Ice-Machines; and I hereby declare the same to be fully, clearly, and exactly described as follows, reference being had to the accompanying drawing, in which a machine embodying my present invention is shown in central vertical sectional view.

My said invention relates to machines for the manufacture of ice wherein the congelation of water contained in suitable molds is produced by the evaporation in contiguity with said molds or with a medium surrounding them of some highly volatile substance. For this purpose ammonia has in practice been found best adapted, the said gas being susceptible of liquefaction at a pressure of about six and a half atmospheres and at a temperature of about 50°. Of course, at lower temperatures a less pressure suffices to liquefy the ammonia; and my invention has for its object to provide a cooler or condenser whereby the heat generated by the compression of the gas is abstracted and the operation of reducing the gas to the form of a liquid is facilitated, the said device being constructed and operating substantially as hereinafter set forth.

In the accompanying drawing, A is a shell, of metal, by preference cylindrical in cross-section, resting upon a base, E, and terminating above in a tapering neck, $a$, and terminal pipe, containing a tube, B, opening in the line of its axis, and adapted to produce a draft on the injector principle through the cylinder A. Near the bottom of the latter are a number of holes, $d\,d$. Within the cylinder A is mounted a second shell, $c$, provided with a number of longitudinal tubes, $c'\,c'$, similar to a common tubular boiler. This shell is made strong enough to sustain a pressure sufficiently greater than that to which it will be subjected in liquefying the gas to render its use perfectly safe.

Into the conical neck $a$ of the shell A is led a pipe, C, which is coiled above the shell $c$, around the latter, and between it and the outer casing, A, and is finally led into the shell $c$, near the bottom, as shown.

The base E is made hollow, and contains an annular chamber, $e$, into which a pipe, D, leads from the bottom of the shell $c$. This chamber $e$ is provided with a gage, $n$, to determine the level of the liquefied ammonia, and has an outlet-pipe, $o$, provided with a suitable cock.

Into the base of the device leads a pipe, $f$, and from the chamber N, into which it opens, project a number of pipes, $h\,h\,h$, corresponding in number with the tubes $c'\,c'\,c'$, a pipe, $h$, being located immediately beneath each tube.

I is a chamber, through which the pipes $h$ project, provided with an inlet-pipe, $m$, terminating flush with its bottom, and an outlet-pipe, $m'$, projecting some distance within this chamber. Water, being led in at $m$, overflows through $m'$, and a constant level is thus maintained.

Small pipes $i\,i\,i$ lead from a point near the bottom of the chamber I and open in the axes of the pipes $h$, constituting atomizers. A conical shell, $a'$, is secured in the neck $a$, constituting with it a drip-chamber, from which leads a drip-pipe, $a''$, serving to conduct away any condensed moisture.

In operation the gaseous ammonia is conducted into the pipe C under pressure from any convenient gas-compressor, the exhaust-steam from the compressor-engine being led into the pipe B, thereby inducing a strong upward draft of air through the holes $d$, and between the shells A and $c$ and over the pipe C, in its convolutions around the inner shell. A blast of air being forced through the pipe $f$ by means of a suitable blower, a cold spray is injected from the atomizers $h\,i$ through the tubes $c'\,c'$, cooling the gas in the shell. Any of this spray which fails to find egress at the top and collects in the form of moisture on the walls of the neck is conducted away by the pipe $a''$. From the shell $c$ the cold compressed ammonia is led through the pipe D into the base-chamber $e$, whence it is drawn as required through the tube $o$ to the congealers.

From the above description of the construction and operation of the device it will be seen that it is practically automatic in its operation, requiring only to be supplied with sufficient water and air to feed the atomizers.

The pipe $m'$ serves to limit the level of water in the chamber I and prevent the chamber from becoming filled and water being forced up the pipes *i i*.

It is obvious that the machine is adapted for use in cooling other gases than ammonia, and for other purposes than in connection with an ice-machine.

I am aware that a steam-jet for creating an air-draft is very old, and such I do not claim.

What I claim is—

1. The combination, in a condenser, of a shell for receiving the compressed gas, having a number of longitudinal tubes, with a series of atomizers for injecting a spray into the said tubes, as and for the purpose set forth.

2. The combination, in a condenser, of a shell for receiving the compressed gas, having a series of longitudinal tubes, with atomizers, as set forth, and an outer shell, between which and the first-named shell the inlet gas-pipe is coiled, as described.

3. The combination, substantially as set forth, of the chambered base, the inlet-coil, the outer perforated cylinder, and the inner tubular shell, as and for the purpose described.

4. The combination, substantially as set forth, of the outer shell, having walls *a a'*, with the injector-pipe located in the neck, the inner tubular shell, and inlet-pipe, as described.

5. The combination, substantially as set forth, with the chambered base having chamber I, provided with pipes opening at different levels, and the atomizers *h i*, of the tubular shell *c*, as described.

6. The combination, substantially as set forth, with the chambered base having blast-pipe *f*, of the atomizers *h i*, tubular shell *c*, coil C, and perforated cylinder A, as described.

ALEXANDER T. BALLANTINE.

Witnesses:
R. D. WILLIAMS,
JOHN C. GITTINGER.